Patented Aug. 25, 1931

1,820,160

UNITED STATES PATENT OFFICE

FRIEDRICH RÜSBERG, OF BERLIN-NIEDERSCHONEWEIDE, GERMANY, ASSIGNOR TO KALI-CHEMIE, AKTIENGESELLSCHAFT, OF BERLIN, GERMANY

SEPARATING MAGNESIUM COMPOUNDS FROM POTASH SALTS

No Drawing. Application filed September 4, 1929, Serial No. 390,414, and in Germany September 7, 1928.

This invention relates to the separation of magnesium-compounds from potash salts or their solutions and to the manufacture of valuable products from crude potash salts and has for its object so to treat the potash salts or their solutions by a more or less chemical process that valuable products and no or only small amounts of valueless by-products are obtained.

Crude potash salts obtained by mining especially in Germany, generally contain as predominant constituents potassium chloride, sodium chloride, magnesium sulfate and magnesium chloride in varying amounts. The usual method for working up these crude potash salts is based on fractional crystallization of solutions of these salts, thus obtaining potassium chloride as valuable product, a solid residue consisting of magnesium sulfate and potassium chloride and a solution containing the chlorides of magnesium and sodium as more or less valueless by-products.

The main object of the invention is the practically complete separation of the magnesium compounds from the other constituents present in crude potash salts.

A further object of the invention is the manufacture of valuable magnesium compounds to be separated from the other constituents of the crude potash salts.

A further object of the invention is the manufacture of magnesium containing fertilizers.

A further object is the production of other valuable products by the process applied for the separation of the magnesium compounds from the other constituents present in the crude potash salts.

A further object of the invention is the manufacture of magnesium-ammonium phosphate, potassium sulfate, sodium carbonate, and ammonium salts from crude potash salts, gaseous ammonia and phosphoric acid of any kind or ammonium phosphates.

Broadly speaking the invention consists in converting the magnesium compounds present in the crude potash salts into the fertilizing magnesium-ammonium phosphate, which enable a practically complete separation of the magnesium compounds from the other constituents present in the crude potash salts. It is, however, not necessary to convert the whole amount of the magnesium compounds present in the raw-material into magnesium-ammonium phosphate, as the same result, namely a practically complete separation of the magnesium compounds from the other constituents of the raw material, is obtained, when a part of the magnesium compounds is removed as magnesium carbonate trihydrate or magnesium - ammonium carbonate or mixtures of these substances by treatment with carbon dioxide in presence of ammonium salts at temperatures below or above 40° C., whereas only the remaining amount of magnesium compounds is converted into magnesium - ammonium phosphate. The liquid remaining after the separation of the magnesium-ammonium phosphate may then be treated with gaseous ammonia, in order to precipitate potassium sulfate, which is separated from the mother liquor, which may be carbonized to furnish sodium bicarbonate and a solution containing ammonium salts or mixtures of ammonium and potassium salts, which may be recovered by crystallization.

The above described step for making potassium sulfate may be the first step of the process and carried out before the separation of the magnesium compounds as described above, the mother liquor of the magnesium-ammonium phosphate precipitation being then directly used for making sodium bicarbonate. It is also possible to remove ammonium chloride from the liquid used in the process as starting material for making sodium bicarbonate by reducing the ammonia concentration of said liquid, treating it with carbon dioxide to form sodium carbonate, which remains dissolved and subjecting the carbonized liquid to crystallization at low temperatures for example 0° C. The mother liquor from this crystallization is then carbonized again to produce sodium bicarbonate, whereas the sodium bicarbonate mother liquor, which still contains ammonium chloride may be used for dissolving fresh potash salts to be treated according to the invention.

The invention will be explained by reference to certain specific examples thereof, but it is to be clearly understood that the invention is not limited to the particular procedure described in these examples, nor otherwise than as defined in the appended claims.

*Example 1*

300 kg. of Hartsalz (Ullmann, Enzyklopädie der technischen Chemie, vol. 6, page 581) are dissolved by heating in 200 liters of water and 700 liters of the ammonium chloride containing mother liquor obtained at the end of the process as described below. After cooling gaseous ammonia is passed into the solution until it is saturated with ammonia, thus obtaining 90 kg. of a precipitate consisting mainly of potassium sulfate, which is separated from its mother liquor. 100 kg. of ammonium diphosphate is gradually added to this mother liquor, thereby precipitating practically all the magnesium present in the mother liquor as magnesium-ammonium phosphate, which is separated from its mother liquor, which is now an amount of about 720 liters and contains about 250 g. of NaCl per liter. This mother liquor is heated or evacuated, until it contains about 75 g. of $NH_3$ per liter and after cooling treated with such amounts of carbon dioxide, as are necessary for converting the sodium chloride into sodium carbonate. The treated solution is then cooled to about 0° C. and 40 kg. of ammonium chloride are crystallized out and separated from the mother liquor, which is then treated with carbon dioxide to precipitate sodium bicarbonate. 195 kg. of a moist sodium bicarbonate with about 85% of $NaHCO_3$ are obtained by filtration, which corresponds to a conversion of about 64% of the sodium chloride present into sodium bicarbonate. The sodium bicabonarte may be converted into sodium carbonate in the usual manner. The ammonium chloride containing mother liquor of the sodium bicarbonate precipitation is used for dissolving fresh Hartsalz as described above.

*Example 2*

1000 kg. of Hartsalz with about 27.1% of KCl, 45.2% of NaCl and 25.3% of $MgSO_4.6H_2O$ are dissolved by heating in about 1500 l. of the final mother liquor obtained according to Example 1 and 600 kg. of a 30% phosphoric acid solution. Ammonia is passed into the solution obtained, until all the phosphoric acid and all the magnesium is precipitated as magnesium-ammonium phosphate, which is separated from the mother liquor by filtration. 500 kg. of magnesium-ammonium phosphate with about 90% of $MgNH_4PO_4.6H_2O$ are obtained. Into the mother liquor gaseous ammonia is passed, until it is saturated with ammonia, thereby precipitating a salt containing 68% of $K_2SO_4$, 20% of $Na_2SO_4$ and 5% of $(NH_4)_2SO_4$, which may be converted into pure potassium sulfate by washing with a saturated solution of potassium sulfate. The mother liquor of the precipitate by the ammonia treatment as described above is worked up in the same manner as the mother liquor of the ammonium diphosphate treatment as described in Example 1.

The specific methods described in the examples may be varied, without deviating from the idea of the invention. Thus for example potash salts free from or poor in magnesium sulfate may be treated with ammonia and phosphoric acid or ammonium phosphates to obtain magnesium-ammonium phosphate. Potassium sulfate is then not manufactured; the potassium chloride present does however not distunb the manufacture of sodium bicarbonate and may be recovered in mixture with ammonium salts from the mother liquor of the sodium bicarbonate precipitation. Also in this case a part of the amount of magnesium compounds present may be separated as magnesium carbonate trihydrate or magnesium-ammonium carbonate or mixture of these substances, whereas only the remaining amount of magnesium compounds is separated as magnesium-ammonium phosphate.

I claim:

1. A method for making valuable products from crude potash salts containing potassium chloride and magnesium sulfate which consists in dissolving the potash salt, converting the magnesium compounds present in the solution into magnesium-ammonium phosphate, separating the magnesium-ammonium phosphate from the mother liquor and precipitating potassium sulfate in said mother liquor by treatment with ammonia.

2. A method for making valuable products from crude potash salts containing potassium chloride and magnesium sulfate which consists in dissolving the potash salt, converting a part of the magnesium compounds present in the solution into precipitating magnesium carbonates, separating the precipitated magnesium compounds from the mother liquor, converting the remaining magnesium compounds present in said mother liquor into magnesium-ammonium phosphate, separating the magnesium-ammonium phosphate from its mother liquor and precipitating potassium sulfate in said mother liquor by treatment with ammonia.

3. A method for making valuable products from crude potash salts containing potassium chloride and magnesium sulfate which consists in treating a solution of the potash salts in presence of ammonium salts with gaseous ammonia, separating the precipitated potassium sulfate from the mother liquor, converting the magnesium compounds present in said mother liquor into magnesium-ammonium phosphate and separating the magnesium-ammonium phosphate from the mother liquor.

4. A method for making valuable products from crude potash salts containing potassium chloride, magnesium sulfate and sodium chloride which consists in treating a solution of the potash salts in presence of ammonium salts with gaseous ammonia, separating the precipitated potassium sulfate from the mother liquor, converting the magnesium compounds present in said mother liquor into magnesium-ammonium phosphate separating the magnesium-ammonium phosphate from the mother liquor, converting the sodium chloride in said mother liquor into sodium bicarbonate, separating the sodium bicarbonate from its mother liquor and crystallizing said mother liquor.

5. A method for making valuable products from crude potash salts containing potassium chloride, magnesium sulfate and sodium chloride which consists in treating a solution of the potash salts in presence of ammonium salts with gaseous ammonia, separating the precipitated potassium sulfate from the mother liquor, converting the magnesium compounds present in said mother liquor into magnesium-ammonium phosphate, separating the magnesium-ammonium phosphate from the mother liquor, treating said mother liquor with carbon dioxide until sodium carbonate is formed from the sodium chloride present in the mother liquor, cooling said treated mother liquor, separating the ammonium chloride precipitated from the liquid, treating said liquid with carbon dioxide to precipitate sodium bicarbonate and separating the sodium bicarbonate from its mother liquor, which is used for dissolving fresh potash salt to be worked up.

6. A method for making valuable products from crude potash salts containing potassium chloride and magnesium sulfate which consists in dissolving the potash salt, converting the magnesium compounds present in the solution into magnesium-ammonium phosphate, separating the magnesium-ammonium phosphate from the mother liquor, treating said mother liquor with ammonia to precipitate potassium sulfate, separating the potassium sulfate from the liquid, converting the sodium chloride present in said liquid into sodium bicarbonate, separating the sodium bicarbonate from its mother liquor and crystallizing said mother liquor.

7. A method for making valuable products from crude potash salts containing potassium chloride and magnesium sulfate which consists in dissolving the potash salt, converting the magnesium compounds present in the solution into magnesium-ammonium phosphate, separating the magnesium-ammonium phosphate from the mother liquor, treating said mother liquor with ammonia to precipitate potassium sulfate, separating the potassium sulfate from the liquid, treating said liquid with carbon dioxide until sodium carbonate is formed from the sodium chloride present in the liquid, cooling said treated liquid, separating the crystallized ammonium chloride from the liquid.

8. A method for making valuable products from crude potash salts containing potassium chloride and magnesium sulfate which consists in dissolving the potash salt, converting the magnesium compounds present in the solution into magnesium-ammonium phosphate, separating the magnesium-ammonium phosphate from the mother liquor, treating said mother liquor with ammonia to precipitate potassium sulfate, separating the potassium sulfate from the liquid, reducing the ammonia concentration in said liquid to about 75 g. $NH_3$ per liter, treating carbonate is formed from the sodium chloride present in the liquid, cooling said treatide present in the liquid, cooling said treated liquid, separating the crystallized ammonium chloride from the liquid.

In testimony whereof I affix my signature.

FRIEDRICH RÜSBERG.